United States Patent
Evans

(10) Patent No.: US 10,726,462 B2
(45) Date of Patent: Jul. 28, 2020

(54) CUSTOMIZING COMPONENT CONFIGURATIONS FOR UTILITY COMPUTING

(71) Applicant: Amazon Technologies, Inc., Seattle, WA (US)

(72) Inventor: Aaron Thomas Evans, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 263 days.

(21) Appl. No.: 15/971,096

(22) Filed: May 4, 2018

(65) Prior Publication Data

US 2018/0253773 A1    Sep. 6, 2018

Related U.S. Application Data

(63) Continuation of application No. 13/795,280, filed on Mar. 12, 2013, now Pat. No. 9,965,785, which is a continuation of application No. 13/050,682, filed on Mar. 17, 2011, now Pat. No. 8,417,578.

(51) Int. Cl.
  *G06Q 30/00* (2012.01)
  *G06Q 30/06* (2012.01)

(52) U.S. Cl.
  CPC ......... *G06Q 30/0621* (2013.01); *G06Q 30/00* (2013.01)

(58) Field of Classification Search
  None
  See application file for complete search history.

(56) References Cited

U.S. PATENT DOCUMENTS

| | | | |
|---|---|---|---|
| 8,396,807 B1 | 3/2013 | Yemini et al. |
| 8,495,648 B1 | 7/2013 | Brandwine et al. |
| 8,595,806 B1 | 11/2013 | Gabrielson |
| 8,606,922 B1 | 12/2013 | Greenfield et al. |
| 8,627,468 B2 | 1/2014 | Kakadia et al. |
| 8,849,947 B1 | 9/2014 | Artzi et al. |
| 9,239,727 B1 | 1/2016 | Panchapakesan |
| 2004/0010592 A1 | 1/2004 | Carver et al. |
| 2005/0278441 A1 | 12/2005 | Bond et al. |
| 2006/0245268 A1 | 11/2006 | Fritz |
| 2007/0174410 A1 | 7/2007 | Croft et al. |
| 2008/0244607 A1 | 10/2008 | Rysin et al. |
| 2008/0301674 A1 | 12/2008 | Faus |

(Continued)

OTHER PUBLICATIONS

The Dell Online Store: build Your System, "Select My Memory & Hard Drive", retrieved Mar. 16, 2011, http:!/configure. us.dell.com/dellstore/config .aspx?oc=fncor15&c=us&I=en&s=dhs&cs=19&model_id=inspiron-15r-combo-mod.

(Continued)

*Primary Examiner* — Mila Airapetian
(74) *Attorney, Agent, or Firm* — Thomas | Horstemeyer, LLP

(57) ABSTRACT

Disclosed are various embodiments for customizing component configurations used in utility computing. A selection of a subset of a set of hardware components is received from a customer. A request is received from the customer to allocate a customized computing device within a networked plurality of computing devices. The customized computing device includes the subset of the set of hardware components. Responsive to the request, the customized computing device is assembled and then installed on a network in a data center.

20 Claims, 6 Drawing Sheets

(56) References Cited

U.S. PATENT DOCUMENTS

| | | |
|---|---|---|
| 2010/0031247 A1 | 2/2010 | Arnold et al. |
| 2011/0137758 A1 | 6/2011 | Bienias |
| 2011/0202405 A1 | 8/2011 | Clark et al. |
| 2011/0238460 A1 | 9/2011 | Al-Dawsari et al. |
| 2011/0270963 A1 | 11/2011 | Saito et al. |
| 2011/0314466 A1 | 12/2011 | Berg et al. |
| 2012/0016721 A1 | 1/2012 | Weinman |
| 2012/0290725 A1 | 11/2012 | Podila |
| 2012/0297188 A1 | 11/2012 | van der Linden |
| 2012/0331476 A1 | 12/2012 | Saffre |
| 2013/0007088 A1 | 1/2013 | Alfredo et al. |
| 2013/0326505 A1 | 12/2013 | Shah |

OTHER PUBLICATIONS

U.S. Appl. No. 12/961,881, filed Dec. 7, 2010, and entitled "Allocating Computing Resources,".

CUSTOMIZING COMPONENT CONFIGURATIONS FOR UTILITY COMPUTING

CROSS-REFERENCE TO RELATED APPLICATIONS

This application is a continuation of, and claims priority to, co-pending U.S. patent application entitled "CUSTOMIZING COMPONENT CONFIGURATIONS FOR UTILITY COMPUTING," filed on Mar. 12, 2013, and assigned application Ser. No. 13/795,280, which is a continuation of, and claims priority to, U.S. patent application entitled "CUSTOMIZING COMPONENT CONFIGURATIONS FOR UTILITY COMPUTING," filed on Mar. 17, 2011, assigned application Ser. No. 13/050,682, issued on Apr. 9, 2013, and assigned U.S. Pat. No. 8,417,578, both of which are incorporated herein by reference in their entirety.

BACKGROUND

A cloud computing resource may include a networked plurality of computing devices. The cloud computing resource may operate under a utility computing model. In a utility computing model, the computing devices and their operating environment are managed by a service provider. Customers are charged for the computing resources they have allocated and/or consumed. The cloud computing resource may also be an elastic computing resource. In an elastic computing resource, the customers may launch and/or terminate machine instances on an as-needed basis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to customizing component configurations for machine instances under a utility computing model. A utility computing service provider may offer a small set of predefined machine instance types, such as, for example, small, medium, large, etc., that may be selected by customers. Although certain characteristics of the predefined machine instance type may be exposed to the customer in an abstract form for comparison between the types (e.g., memory, number of processor-equivalent units, etc.), most details regarding the actual hardware are hidden from the customer and cannot be configured. However, some customers may desire certain types of computing components (e.g., solid-state data storage for fast data access, graphics processing units (GPUs) for graphics rendering, etc.) that may not be commonly sought after and may not be available in the predefined machine instance types.

Various embodiments of the present disclosure facilitate customization of component configurations for machine instances by customers. To this end, available components may be presented in a user interface for customer selection. The selections are validated to ensure that the components are compatible in the specified combination. Costs, lead times for assembly, and other availability information related to the component configuration may be shown to allow the customer to make an informed decision. Once a component configuration is created, the customer may launch machine instances corresponding to the component configuration in a cloud computing resource. In the following discussion, a general description of the system and its components is provided, followed by a discussion of the operation of the same.

Figure 1:
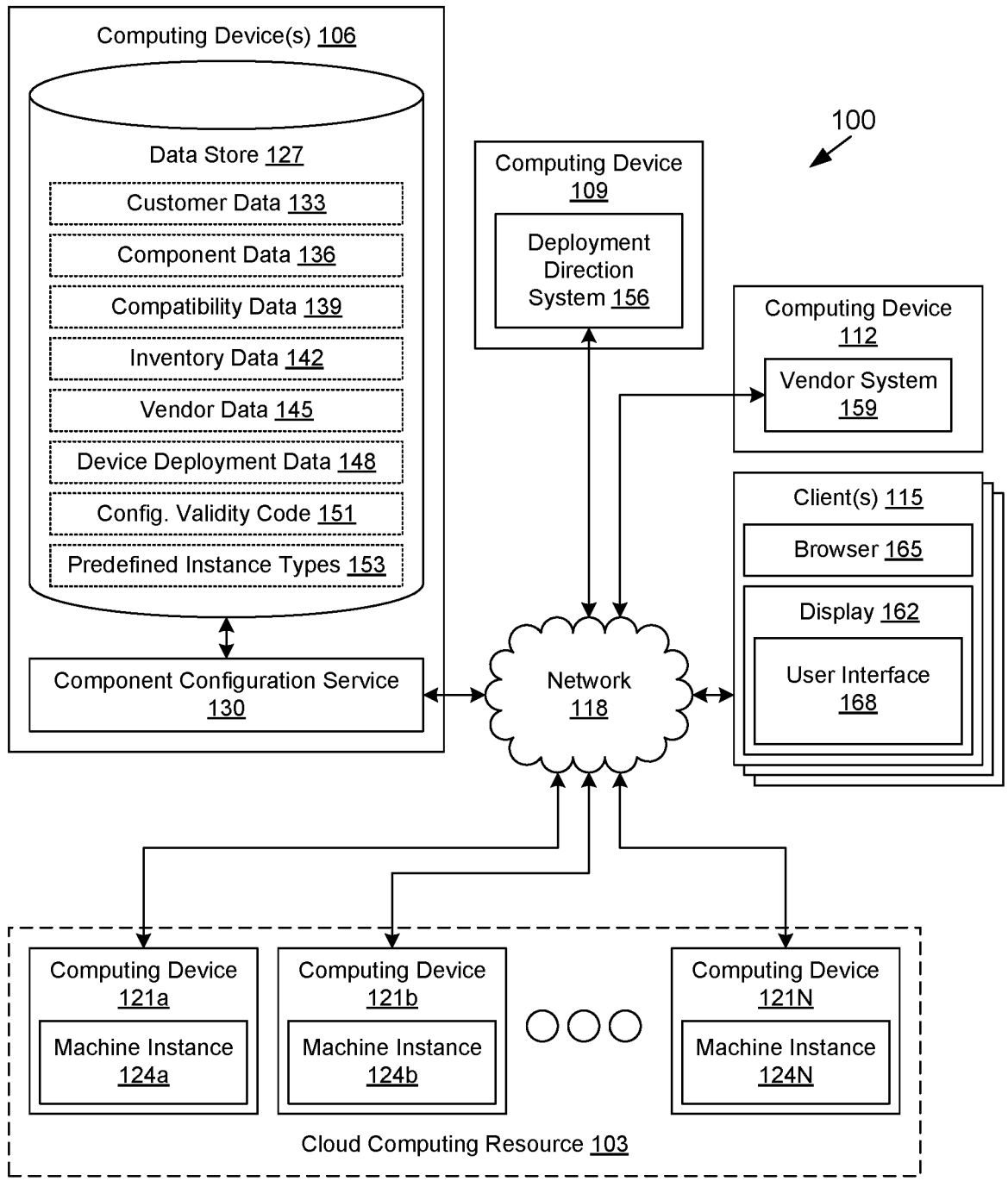
FIG. 1 is a drawing of a networked environment according to various embodiments of the present disclosure.

With reference to FIG. 1, shown is a networked environment 100 according to various embodiments. The networked environment 100 includes a cloud computing resource 103, one or more computing devices 106, one or more computing devices 109, one or more computing devices 112, and one or more clients 115 in data communication by way of a network 118. The network 118 includes, for example, the Internet, intranets, extranets, wide area networks (WANs), local area networks (LANs), wired networks, wireless networks, or other suitable networks, etc., or any combination of two or more such networks.

The cloud computing resource 103 includes a networked plurality of computing devices 121a, 121b . . . 121N that are operated by a service provider according to a utility computing model. Under a utility computing model, computing resources are provided to a plurality of customers for a fee. The fee is assessed corresponding to the computing resources that are consumed or reserved for the customer. The cloud computing resource 103 may also correspond to an elastic computing resource, where a customer may allocate and consume computing resources on an as-needed basis. The customer may benefit, for example, from lower upfront costs and more flexibility in comparison to computing resources that are owned by the customer.

Each respective computing device 121a, 121b . . . 121N in the cloud computing resource 103 may provide one or more corresponding machine instances 124a, 124b . . . 124N to customers. In some embodiments, a machine instance 124 may be implemented by a low-level wrapper that gives the customer nearly unfettered access to the resources of the computing device 121. The service provider may retain administrative control over some features such as, for example, monitoring, device drivers, etc. In other embodiments, a machine instance 124 may correspond to a virtualized computing environment with a hypervisor such as VMware®, Xen®, etc. that abstracts many features of the underlying computing device 121. Where the machine instance 124 corresponds to a virtualized computing environment, multiple machine instances 124 may be allocated to a single computing device 121. The multiple machine instances 124 on a single computing device 121 may be allocated for the use of one or more different customers.

The computing devices 121 employed in the cloud computing resource 103 may have different component configurations. As a non-limiting example, the computing device 121a may have an 800 MHz central processing unit (CPU), 256 MB of random-access memory (RAM), and a 10 GB hard drive, while the computing device 121b may have a 2.2 GHz CPU, 4 GB of RAM, and a 512 GB hard drive. Some of the computing devices 121 may correspond to predefined component configurations, while others of the computing devices 121 may correspond to customized component configurations. The computing devices 121 of the cloud computing resource 103 may be located in multiple data centers and may be structured into multiple availability zones with different power sources, different connections to the network 118, and/or other features that reduce the likelihood of availability failures across more than one availability zone.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above. The computing device 106 is described separately from the cloud computing resource 103, but it is understood that the computing device 106 may correspond to a computing device 121 in the cloud computing resource 103 in some embodiments.

Various applications and/or other functionality may be executed in the computing device 106 according to various embodiments. Also, various data is stored in a data store 127 that is accessible to the computing device 106. The data store 127 may be representative of a plurality of data stores 127 as can be appreciated. The data stored in the data store 127, for example, is associated with the operation of the various applications and/or functional entities described below.

The components executed on the computing device 106, for example, include a component configuration service 130 and other applications, services, processes, systems, engines, or functionality not discussed in detail herein. The component configuration service 130 is executed to facilitate the customization of component configurations employed for the computing devices 121 in the cloud computing resource 103. To this end, the component configuration service 130 may generate network pages, such as web pages or other forms of network content, that include interfaces for customers to select a subset of computing components to be used in assembling a computing device 121. In some embodiments, the component configuration service 130 may comprise a web service that supplies information over hypertext transfer protocol (HTTP) to another service that generates network pages or other user interfaces based at least in part on the supplied information.

The component configuration service 130 may also perform various management functions for the cloud computing resource 103, such as, for example, allocating machine instances 124 for a customer according to a component configuration, deallocating machine instances 124, and/or other functions. It is understood that some of the functions performed by the component configuration service 130 may be performed by other services, applications, etc. in other embodiments.

The data stored in the data store 127 includes, for example, customer data 133, component data 136, compatibility data 139, inventory data 142, vendor data 145, device deployment data 148, configuration validity code 151, predefined instance types 153, and potentially other data. The customer data 133 includes various data regarding customers of the cloud computing resource 103. Such data may include, for example, billing information, usage information, machine instances 124 that are currently allocated, machine instances 124 that are reserved within an availability zone, and other customer-related data. The component data 136 describes a plurality of computing components that may be selected for use in a computing device 121. Non-limiting examples of types of computing components may include CPUs, memory configurations, graphics hardware, connections to the network 118, power connection, storage devices, operating systems, machine images, software applications, and/or other computing components.

The compatibility data 139 may indicate whether combinations of computing components are compatible with one another. As a non-limiting example, a certain solid-state storage device may have a serial advanced technology attachment (SATA) interface. If a 400 MHz CPU were selected, it may be the case that the only compatible motherboard has an integrated drive electronics (IDE) interface, but no SATA interface. Therefore, the compatibility data 139 may indicate that the solid-state drive and the 400 MHz CPU are not compatible. As another non-limiting example, a high-end video card may have a minimum system memory requirement of 2 GB. In some embodiments, computing components may be deemed incompatible in the compatibility data 139 for reasons other than physical incompatibility. As a non-limiting example, computing components that are not combined together in a preexisting, available computing device 121 may be deemed incompatible in the compatibility data 139 for business reasons.

The inventory data 142 tracks the computing devices 121 and computing components that are in inventory. Each location where computing devices 121 are assembled (e.g., a data center or another location) may have computing components in inventory, ready to be used in assembling new computing devices 121. Also, some pre-existing computing devices 121 may be unallocated to customers and may either be allocated to customers or used as a source of spare computing components. The vendor data 145 may describe one or more vendors from which computing components and/or computing devices 121 may be ordered. To this end, the vendor data 145 may include a listing of computing components and/or computing devices 121 that a vendor supplies, along with prices, lead times, availability information, ordering information, etc.

The device deployment data 148 includes information regarding deployment of computing devices 121. For example, the device deployment data 148 may track the status of a deployment of a computing device 121, such as the current status of the computing components, the current status of assembly of the computing device 121, the current status of the installation of the computing device 121 in a data center, and so on. The configuration validity code 151 corresponds to code that is configured to verify whether a selected subset of computing components corresponds to a valid component configuration. The configuration validity code 151 may correspond, for example, to JavaScript, VBScript, and/or other client-side code or server-side code.

In one embodiment, the configuration validity code 151 compares the selected subset of computing components to all possible valid component configurations to determine if a match is found. In another embodiment, the configuration validity code 151 may compare each selected computing component with the other selected computing components using the compatibility data 139 to determine whether all of the selected computing components are compatible with one another. The configuration validity code 151 may also be configured to check the inventory data 142, vendor data 145, and/or other sources to determine whether the selected computing components are available. The configuration validity code 151 may be executed by the component configuration service 130 on the server side or by an application executed in the client 115.

The predefined instance types 154 may correspond to types of machine instances 124 that are predefined and may be generally available for allocation in the cloud computing resource 103. Non-limiting examples of the predefined instance types 154 may include "small," "medium," "large," "high-memory," "high-CPU," "cluster compute," "cluster GPU," and so on. Each predefined instance type 154 may be associated with multiple component configurations for computing devices 121 that meet the criteria established for the predefined instance type 154.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. The components executed on the computing device 109, for example, include a deployment direction system 156 and other applications, services, processes, systems, engines, or functionality not discussed in detail herein. The deployment direction system 156 is executed to obtain deployment instructions from the component configuration service 130 and direct deployment of one or more computing devices 121 in a location such as a data center or other location. In various embodiments, the deployment direction system 156 may be configured to source computing components from vendors and to generate a bill of materials. The deployment direction system 156 may be configured to direct the action of machines and/or human agents to gather the computing components, to assemble them into a computing device 121, to install the computing device 121 on the network 118 in a data center, and/or to take other actions regarding deployment.

The computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in the various arrangements as described above.

Various applications and/or other functionality may be executed in the computing device 112 according to various embodiments. The components executed on the computing device 112, for example, include a vendor system 159 and other applications, services, processes, systems, engines, or functionality not discussed in detail herein. The vendor system 159 is executed to obtain purchase orders for computing components for one or more component vendors. To this end, the vendor system 159 may support an interface for communicating with the deployment direction system 156, the component configuration service 130, and/or other systems by way of the network 118. In addition to obtaining purchase orders, the vendor system 159 may also be configured to report status updates regarding the processing, fulfillment, and transit of orders. Further, the vendor system 159 may report price, compatibility, and/or other information regarding components. The vendor system 159 may be configured to perform other functions as well.

The client 115 is representative of a plurality of client devices that may be coupled to the network 118. The client 115 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 115 may include a display 162. The display 162 may comprise, for example, one or more devices such as cathode ray tubes (CRTs), liquid crystal display (LCD) screens, gas plasma-based flat panel displays, LCD projectors, or other types of display devices, etc.

The client 115 may be configured to execute various applications such as a browser 165 and/or other applications. The browser 165 may be executed in a client 115, for example, to access and render network pages, such as web pages, or other network content served up by the computing device 106 and/or other servers, thereby generating a user interface on the display 162. The client 115 may be configured to execute applications beyond the browser 165 such as, for example, email applications, instant message applications, and/or other applications.

Next, a general description of the operation of the various components of the networked environment 100 is provided. To begin, a customer at a client 115 may establish an account on the cloud computing resource 103, and customer data 133 is created for the customer. In some examples, the customer may establish an account subsequent to selecting components for a custom configuration. The component configuration service 130 or another application generates network pages or other network content that facilitates customer selection of various computing components for inclusion in a computing device 121.

The customer may select from a variety of types of components, such as, for example, processors, storage devices, operating systems, and so on. In some cases, certain components (e.g., cases, case fans, motherboards, etc.) may be unlisted and inferred based at least in part on the components that are selected. The options presented to the customer may be determined based in part on availability, compatibility, and/or other factors. The components may be physically available in or near a data center or other facility where computing devices 121 are assembled. Alternatively, or additionally, the components may be ordered from a vendor through a vendor system 159.

The selections of the customer are validated to ensure that they represent a valid configuration. In other words, the computing components are examined to determine whether they are compatible with one another or are otherwise allowed or disallowed in combination. To this end, the component configuration service 130 may consult the compatibility data 139. The configuration validity code 151 may be executed to enforce one or more rules that prevent selection of an incompatible subset of computing components. In some embodiments, all possible valid combinations of computing components may be stored. In such a case, the component configuration service 130 may be configured to compare the current selection to the stored valid combinations to determine whether the current selection is valid. If the current selection does correspond to a valid configuration, the component configuration may be stored.

The customer may then launch or allocate machine instances 124 according to the custom component configuration. The component configuration service 130 then initiates a deployment of one or more computing devices 121 conforming to the custom component configuration. If computing devices 121 including the selected components are not free and available, new computing devices 121 may be assembled on-site at a data center or at another location for transport to the data center. To this end, various components may be held in inventory at the location as specified in the inventory data 142. In addition, other components may be ordered from a vendor system 159 on-demand.

When the components are unallocated and otherwise available, the components may be assigned toward the deployment. When all of the computing components are available, the computing device(s) 121 may be assembled, installed at the data center, booted up, and allocated to the customer. The component configuration service 130 may interface with a deployment direction system 156 that is configured to direct the deployment. In various embodiments, a bill of materials may be generated specifying the selected components and other components. The physical assembly of a computing device 121 may be directed according to such a bill of materials. Because there may be a significant lead time involved in parts sourcing and assembly, the customer may be informed of the expected lead time and given an identification of the machine instance 124 that will become accessible when the computing device 121 is finally allocated to the customer.

Because the cloud computing resource 103 may correspond to an elastic computing resource, various quantities of machine instances 124 may be allocated and/or deallocated on demand by the customer in subsequent requests. When a customized machine instance 124 is deallocated or otherwise relinquished by the customer, the underlying computing device 121 may be maintained for future use by the customer or other customers or repurposed for another custom component configuration. Various techniques related to allocating computing resources and reconfiguring existing computing resources are described in a U.S. Patent Application entitled "Allocating Computing Resources" filed on Dec. 7, 2010 and assigned application Ser. No. 12/961,881, which is incorporated herein by reference in its entirety. Because the machine instances 124 are allocated according to a utility computing model, the customer pays the service provider a fee for use of the machine instances 124 while they are allocated.

Figure 2:
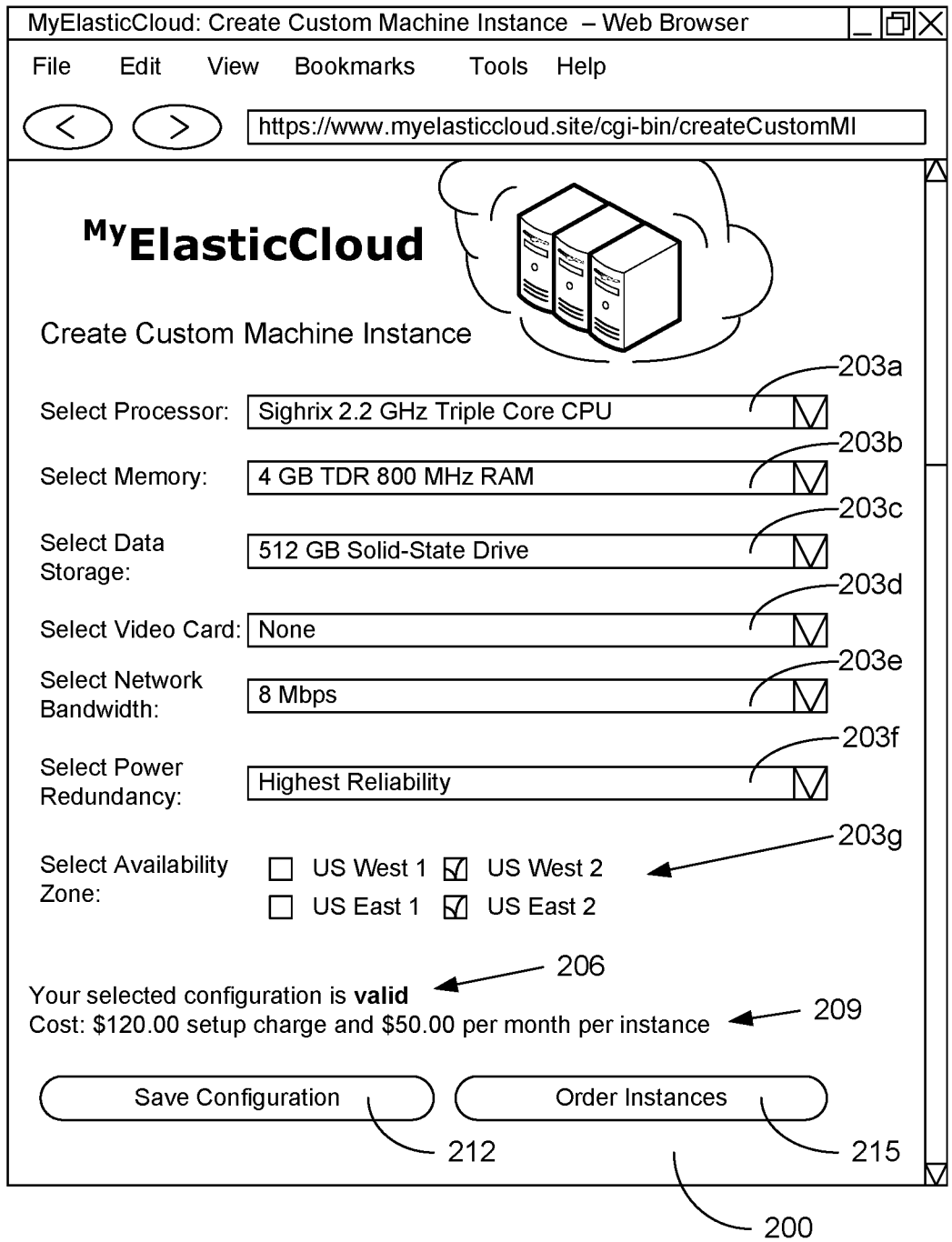
FIG. 2 is a drawing of an example of a user interface rendered by a client in the networked environment of FIG. 1 according to various embodiments of the present disclosure.

Moving on to FIG. 2, shown is one example of a user interface 168 rendered by a browser 165 (FIG. 1) executed in a client 115 (FIG. 1) in the networked environment 100 (FIG. 1). Specifically, the user interface 168 includes a rendered network page 200 that enables a customer to select computing components to define a custom component configuration for a machine instance 124 (FIG. 1). The rendered network page 200 includes a plurality of selection tools 203 that are user interface components that are used to select computing components for a variety of component types. Although the selection tools 203 are represented as drop-down boxes, it is understood that the selection tools 203 may comprise text input fields, buttons, radio buttons, sliders, and/or other user interface components in other embodiments.

The selection tool 203a enables the customer to select from a variety of CPUs. The selection tool 203b enables the customer to select from a variety of memory sizes and configurations. The selection tool 203c enables the customer to select from a variety of data storage devices and sizes. The selection tool 203d enables the customer to select a video card. The selection tool 203e enables the customer to select a network bandwidth. The selection tool 203f enables the customer to select a level of power redundancy. The selection tool 203g enables the user to select one or more availability zones or data centers for deployment of machine instances 124 with the selected configurations. Cost and/or availability of the machine instances 124 may depend in part on the selected availability zones or data centers in some embodiments. In this example, the selection tool 203g includes a plurality of checkboxes, though other user interface components may be used in other examples of the selection tool 203g. The selection tools 203 provided in the example of FIG. 2 are provided merely as an example and do not include an exhaustive listing of possible computing component types. Further, different component types may be managed in other examples.

It is noted that it may be acceptable for a selection tool 203 to be left with no selection or at a default value. For example, selection tool 203d is left at "None," which indicates that no video card is selected. Thus, some computing component types may be optional for inclusion in a computing device 121 (FIG. 1) and a machine instance 124. By contrast, some component types may be required. Further, some component selections may be incompatible with other component selections. Thus, the browser 165 may execute configuration validity code 151 (FIG. 1) upon a selection using a selection tool 203 to determine the validity of a selection. In other embodiments, the validity check may be performed on the server side when the form data is submitted for the component configuration.

A validity indication 206 may be provided to indicate to the customer whether the current combination of selections through the selection tools 203 correspond to a valid component configuration. Cost information 209 may be provided to inform the customer about upfront and continuing costs associated with the selections if they were applied to a machine instance 124. Other information such as availability and lead-time information may be provided in the rendered network page 200 based upon the current selections.

A save configuration tool 212 may be provided to enable the customer to save the current selections as a component configuration. An order instances tool 215 may be provided to enable the customer to allocate machine instances 124 pursuant to the selected configuration or another configuration.

Figure 3:
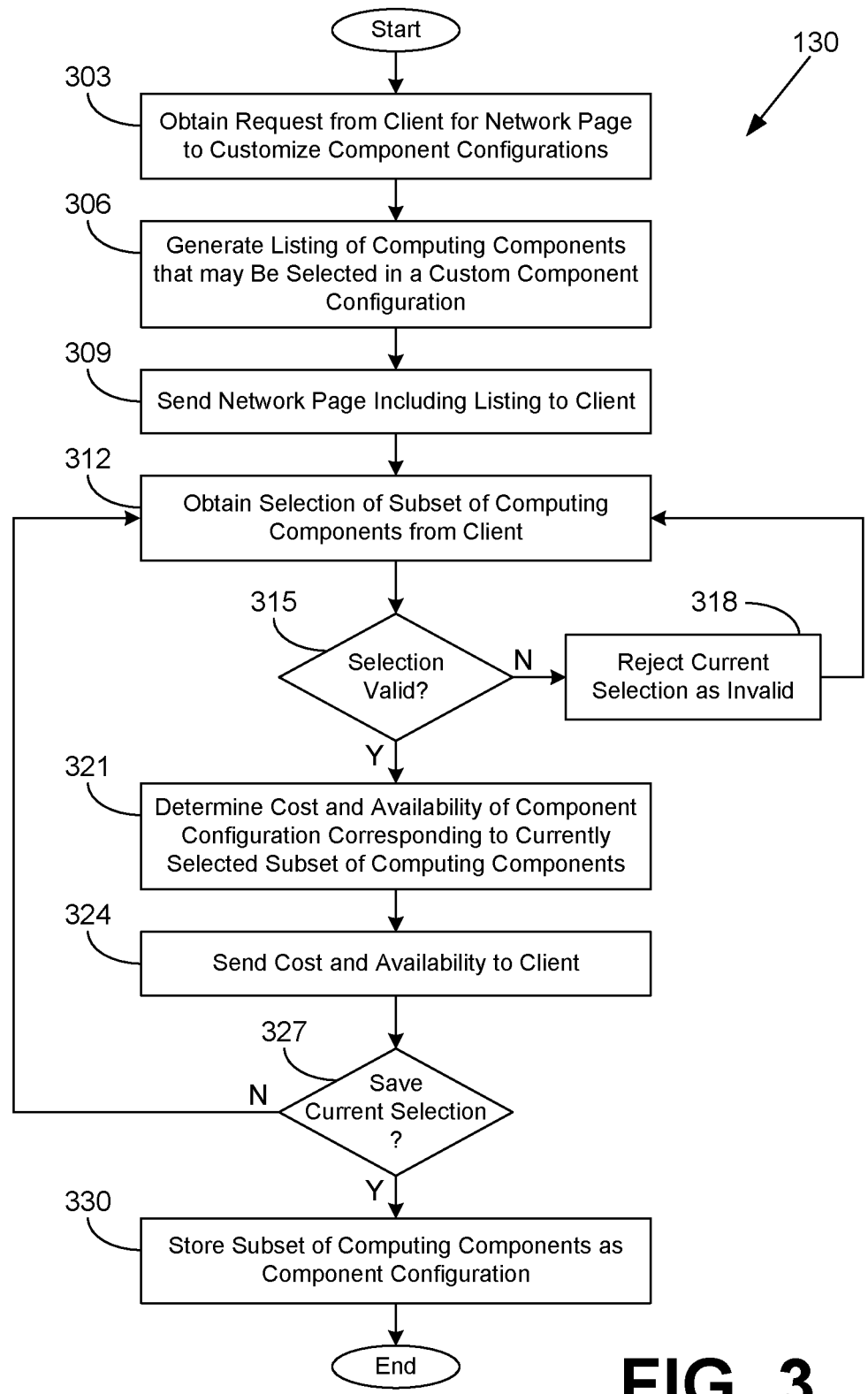
FIGS. 3 and 4 are flowcharts illustrating examples of functionality implemented as portions of a component configuration service executed in a computing device in the networked environment of FIG. 1 according to various embodiments of the present disclosure.

Referring next to FIG. 3, shown is a flowchart that provides one example of the operation of a portion of the component configuration service 130 according to various embodiments. It is understood that the flowchart of FIG. 3 provides merely an example of the many different types of functional arrangements that may be employed to implement the operation of the portion of the component configuration service 130 as described herein. As an alternative, the flowchart of FIG. 3 may be viewed as depicting an example of steps of a method implemented in the computing device 106 (FIG. 1) according to one or more embodiments.

Beginning with box 303, the component configuration service 130 obtains a request from a client 115 (FIG. 1) for a network page that includes a user interface 168 (FIG. 1) for customizing component configurations for computing devices 121 (FIG. 1) in the cloud computing resource 103 (FIG. 1). The client 115 may be associated with a customer. In box 306, the component configuration service 130 generates a listing of computing components that may be selected in a custom component configuration. To this end, the component configuration service 130 may determine available computing components, for example, from component data 136, inventory data 142, etc. In box 309, the component configuration service 130 sends a network page that includes the listing of computing components to the client 115 over the network 118 (FIG. 1).

In box 312, the component configuration service 130 obtains a selection of a subset of the computing components from the client 115. In box 315, the component configuration service 130 determines whether the selection is valid. The component configuration service 130 may, for example, execute the configuration validity code 151 (FIG. 1) to determine whether the selection is valid. If the selection is determined not to be valid, the component configuration service 130 moves to box 318 and rejects the current selection as invalid. In addition, a notification of the rejection may be sent to the client 115. The component configuration service 130 then returns to box 312 and obtains another selection.

If, instead, the selection is determined to be valid in box 315, the component configuration service 130 moves to box 321. In box 321, the component configuration service 130 determines the cost and availability of the component configuration corresponding to the currently selected subset of the computing components. In box 324, the component configuration service 130 sends the cost and availability to the client 115. It is noted that the cost and availability may be determined for a complete or partial selection of computing components in various embodiments. Where only a partial selection is made, the component configuration service 130 may determine the cost using a predetermined minimum, by inferring the presence of other unselected components, and/or by other approaches. The cost and availability information may be updated multiple times as various computing components are selected and/or deselected in the user interface 168 (FIG. 1).

In box 327, the component configuration service 130 determines whether the currently selected subset of computing components is to be saved. If the currently selected subset of computing components is not to be saved, the component configuration service 130 may return to box 312 and obtain another selection of a subset of computing components from the client 115. If the current selection is to be saved, the component configuration service 130 proceeds to box 330 and stores the currently selected subset of computing components as a component configuration for the customer at the client 115. The customer may provide a name to distinguish the component configuration from other saved component configurations. In one embodiment, such a name may be automatically generated. The component configuration may be stored in the customer data 133 (FIG. 1) associated with the customer. Thereafter, the portion of the component configuration service 130 ends.

Figure 4:
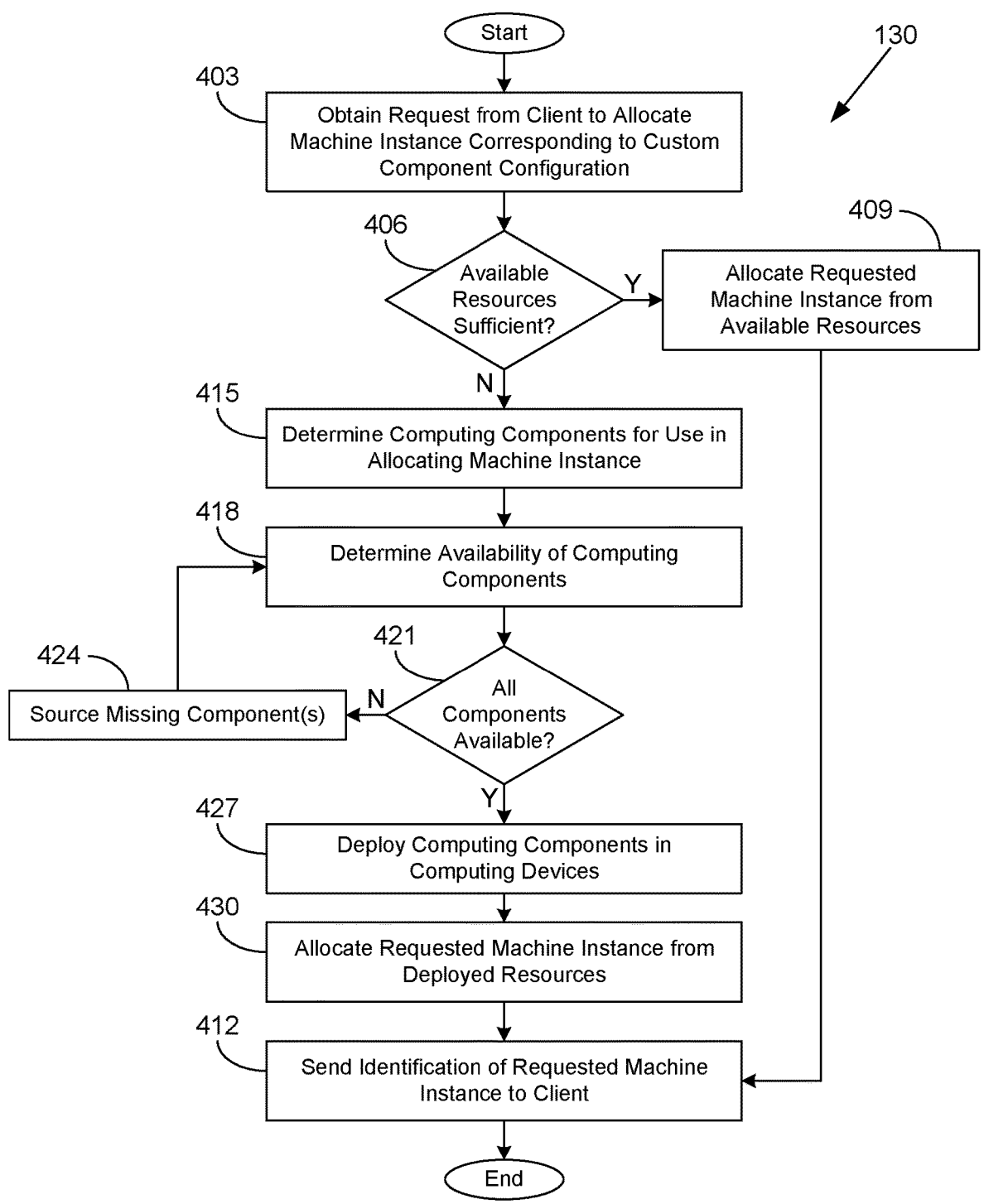

Turning now to FIG. 4, shown is a flowchart that provides one example of the operation of another portion of the component configuration service 130 according to various embodiments. It is understood that the flowchart of FIG. 4 provides merely an example of the many different types of functional arrangements that may be employed to implement the operation of the portion of the component configuration service 130 as described herein. As an alternative, the flowchart of FIG. 4 may be viewed as depicting an example of steps of a method implemented in the computing device 106 (FIG. 1) according to one or more embodiments.

Beginning with box 403, the component configuration service 130 obtains a request from a client 115 (FIG. 1) associated with a customer to allocate one or more machine instances 124 (FIG. 1) corresponding to a custom component configuration. In box 406, the component configuration service 130 determines whether the available computing resources of the cloud computing resource 103 (FIG. 1) are sufficient to allocate the machine instances 124. For example, the component configuration service 130 may determine whether a computing device 121 (FIG. 1) is available that conforms to the custom component configuration. The component configuration service 130 may, for example, refer to the inventory data 142 (FIG. 1) or other metadata regarding the cloud computing resource 103 to determine whether such resources are available.

If a computing device 121 is available that conforms to the custom component configuration, the component configuration service 130 moves to box 409 and allocates the requested machine instance 124 for the customer from the available resources. In box 412, the component configuration service 130 sends an identification of the requested machine instance 124 to the client 115. The machine instance 124 may be instantly available or may be available following a reconfiguration time period. Thereafter, the portion of the component configuration service 130 ends.

If the available resources are not sufficient to fulfill the request, the component configuration service 130 may move from box 406 to box 415. In box 415, the component configuration service 130 determines the computing components that are to be used in allocating the machine instance 124. For example, the component configuration service 130 may determine the computing components for use in assembling or reconfiguring one or more computing devices 121 according to the request. In some embodiments, the custom component configuration may not specify all of the computing components that are to be used in a computing device 121. Thus, the component configuration service 130 may also determine other computing components that are to be used in assembling or reconfiguring the computing device 121.

In box 418, the component configuration service 130 determines the availability of the computing components to be used in allocating the machine instances 124 according to the inventory data 142, the vendor data 145, and/or other data. In one embodiment, the component configuration service 130 may also communicate with one or more vendor systems 159 (FIG. 1) over the network 118 (FIG. 1) to determine the availability of computing components that are to be ordered from the corresponding vendors. In box 421, the component configuration service 130 determines whether all components are available and ready.

If not all components are available and ready, the component configuration service 130 moves to box 424 and sources the missing computing components. In one example, the component configuration service 130 may place one or more purchase orders with one or more vendor systems 159 for the missing computing component(s). In another example, the component configuration service 130 may obtain the missing component(s) from another data center or component storage facility. The component configuration service 130 may wait for the component(s) to arrive. The component configuration service 130 returns to box 418 and reassesses the availability of the computing components.

When all computing components are available and ready, the component configuration service 130 moves from box 421 to box 427. In box 427, the component configuration service 130 deploys the computing components in one or more computing devices 121. As a non-limiting example, the component configuration service may direct the physical assembly of the computing device 121 from the computing components. As another non-limiting example, the physical assembly may refer to installing a disk image with an operating system on a computing device and/or other software-related configuration tasks. As another non-limiting example, the deployment may refer to enabling a higher bandwidth connection for a computing device 121 to the network 118 in a router or other network management device. As yet another non-limiting example, the deployment may refer to placing various hardware components within a case and connecting the components to one another so as to build a bootable computing device 121. In some embodiments, the component configuration service 130 may communicate with the deployment direction system 156 (FIG. 1) over the network 118 so that the deployment direction system 156 manages physical assembly and/or other deployment aspects.

In box 430, the component configuration service 130 allocates the deployed resources for the requested machine instance(s) 124 for the customer. The component configuration service 130 then proceeds to box 412. In box 412, the component configuration service 130 sends an identification of the requested machine instance(s) 124 to the client 115. The machine instance 124 may be instantly available or may available following a configuration time period. Thereafter, the portion of the component configuration service 130 ends.

Figure 5:
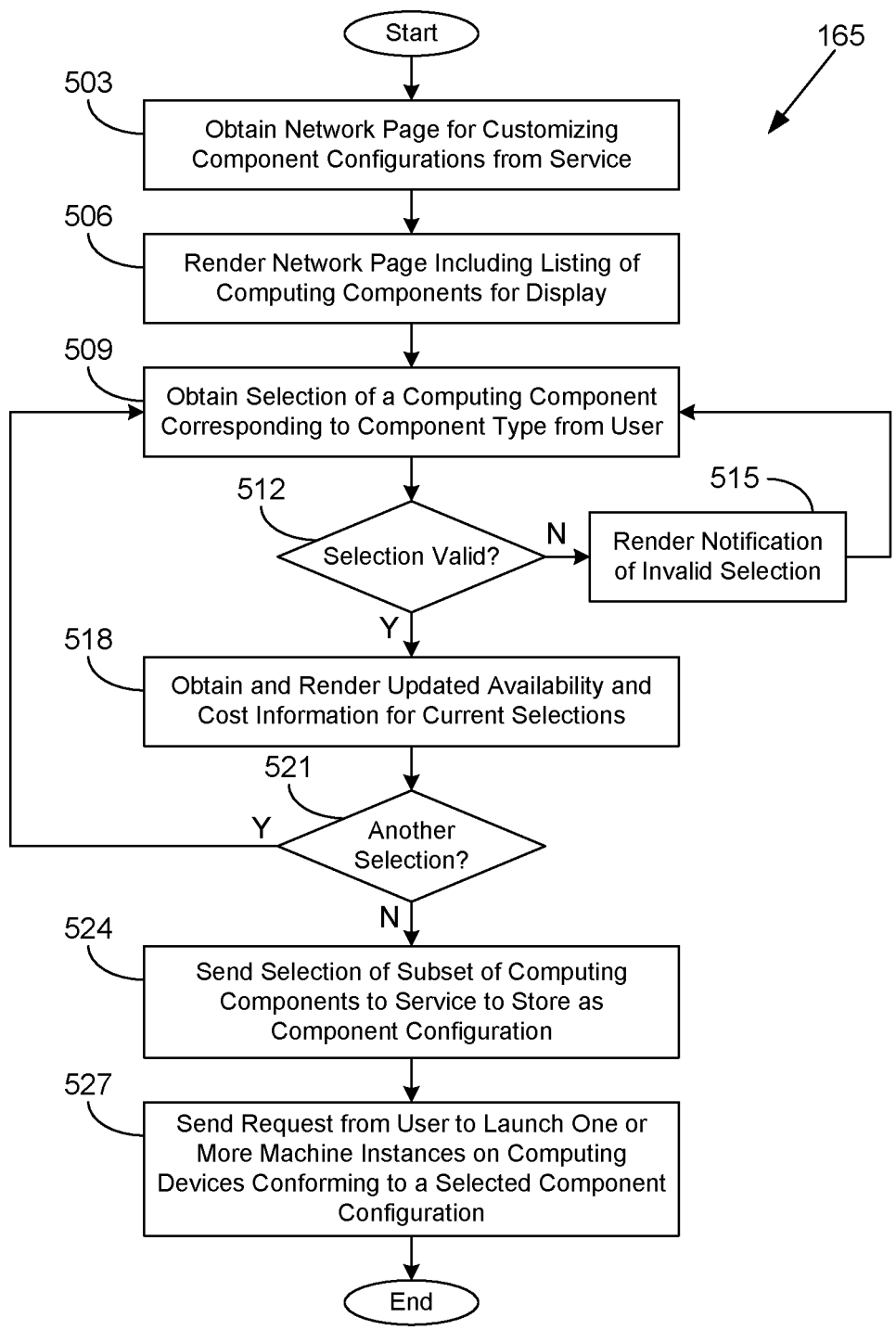
FIG. 5 is a flowchart illustrating one example of functionality implemented as portions of a browser executed in a client in the networked environment of FIG. 1 according to various embodiments of the present disclosure.

Continuing on to FIG. 5, shown is a flowchart that provides one example of the operation of a portion of the browser 165 according to various embodiments. It is understood that the flowchart of FIG. 5 provides merely an example of the many different types of functional arrangements that may be employed to implement the operation of the portion of the browser 165 as described herein. As an alternative, the flowchart of FIG. 5 may be viewed as depicting an example of steps of a method implemented in the client 115 (FIG. 1) according to one or more embodiments.

Beginning with box 503, the browser 165 obtains a network page for customizing component configurations from the component configuration service 130 (FIG. 1) executed in the computing device 106 (FIG. 1). In box 506, the browser 165 renders the network page, which includes a listing of computing components, for display on the display 162 (FIG. 1). In box 509, the browser 165 obtains a selection of a computing component corresponding to a computing component type from a user. As a non-limiting example, a drop-down box with several memory choices may be presented to the user in the user interface 168. The user may select one of the options in the drop-down box, and the option may correspond to a specific type of memory.

In box 512, the browser 165 determines whether the selection is valid. For example, in one embodiment, the browser 165 may download the configuration validity code 151 (FIG. 1) in the network page. The configuration validity code 151 may be executed when a selection change is made in the drop-down box. In some embodiments, the browser 165 may be configured to communicate with the component configuration service 130 using Ajax or another technology to determine whether the selection is valid. If the selection is not valid, the browser 165 renders a notification of an invalid selection in box 515. The browser 165 then returns to box 509 and obtains another selection. If the selection is valid, the browser 165 continues to box 518.

In box 518, the browser 165 obtains updated availability and cost information for the current component selections from the component configuration service 130. The browser 165 renders the updated availability and cost information for display. In box 521, the browser 165 determines whether another selection is to be made. If another selection is made, the browser 165 returns to box 509 and obtains another selection. If another selection is not to be made, the browser 165 proceeds to box 524.

In box 524, the browser 165 sends the selection of a subset of the computing components to the component configuration service 130 to be stored as a custom component configuration. In box 527, the browser 165 sends a request from the user to launch one or more machine instances 124 (FIG. 1) on one or more computing devices 121 (FIG. 1) conforming to a selected component configuration. The selected component configuration may correspond to the custom component configuration created following box 524, another custom component configuration, or a predefined instance type 153 (FIG. 1). Thereafter, the portion of the browser 165 ends.

Figure 6:
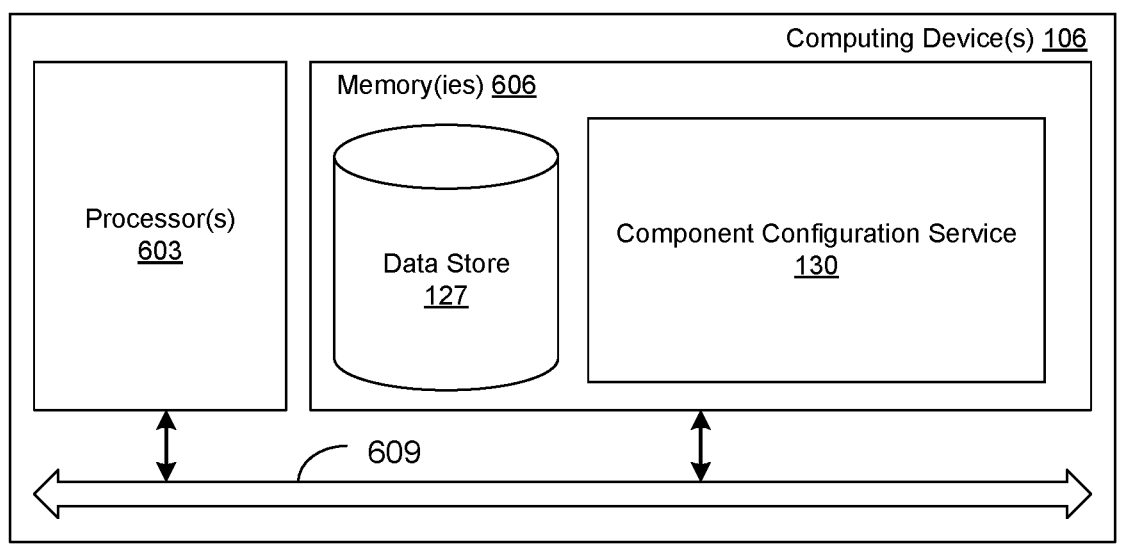
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 106 according to an embodiment of the present disclosure. The computing device 106 includes at least one processor circuit, for example, having a processor 603 and a memory 606, both of which are coupled to a local interface 609. To this end, the computing device 106 may comprise, for example, at least one server computer or like device. The local interface 609 may comprise, for example, a data bus with an accompanying address/control bus or other bus structure as can be appreciated. It is understood the computing devices 109, 112, and 121 may be structured similarly to the computing device 106 in various embodiments.

Stored in the memory 606 are both data and several components that are executable by the processor 603. In particular, stored in the memory 606 and executable by the processor 603 is the component configuration service 130 and potentially other applications. Also stored in the memory 606 may be a data store 127 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 118 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the component configuration service 130 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the component configuration service 130 and the browser 165 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the component configuration service 130 and the configuration validity code 151 (FIG. 1), that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, by at least one computing device, a selection of a subset of a set of hardware components from a customer;
   receiving, by the at least one computing device, a request from the customer to allocate a customized computing device within a networked plurality of computing devices, the customized computing device including the subset of the set of hardware components; and
   responsive to the request:
   assembling the customized computing device with the subset of the set of hardware components; and
   installing the customized computing device on a network in a data center.

2. The method of claim 1, further comprising sending, by the at least one computing device, a notification of an expected lead time for installing the customized computing device to the customer.

3. The method of claim 1, further comprising providing, by the at least one computing device, access to the customized computing device to the customer.

4. The method of claim 1, further comprising enforcing, by the at least one computing device, one or more rules that prevent a selection of an incompatible subset of the set of hardware components by the customer.

5. The method of claim 1, further comprising:
   receiving, by the at least one computing device, a subsequent request to launch a virtual machine instance on the customized computing device from the customer; and
   launching, by the at least one computing device, the virtual machine instance on the customized computing device in response to the subsequent request.

6. The method of claim 1, further comprising:
   identifying, by the at least one computing device, a vendor offering at least one hardware component from the subset of the set of hardware components; and
   generating, by the at least one computing device, a bill of materials for the customized computing device that includes the at least one hardware component offered by the vendor.

7. The method of claim 1, further comprising transporting the customized computing device from an assembly location to the data center.

8. A system, comprising:
   at least one computing device; and
   an application executable in the at least one computing device, wherein when executed the application causes the at least one computing device to at least:
   receive a selection of a subset of a set of hardware components from a user;
   receive a request from the user to allocate a customized computing device within a networked plurality of computing devices, the customized computing device including the subset of the set of hardware components; and
   responsive to the request:
   assemble the customized computing device with the subset of the set of hardware components; and
   install the customized computing device on a network in a data center.

9. The system of claim 8, wherein when executed the application causes the at least one computing device to at least:
   calculate an estimated lead time for the customized computing device to be made available to the user; and
   send a notification of the estimated lead time to the user.

10. The system of claim 8, wherein when executed the application causes the at least one computing device to at least allocate the customized computing device to the user.

11. The system of claim 8, wherein when executed the application causes the at least one computing device to at least:
    receive a subsequent request from the user to deallocate the customized computing device; and
    allocate the customized computing device to a different user.

12. The system of claim 8, wherein when executed the application causes the at least one computing device to at least generate a bill of materials specifying the subset of the set of hardware components and a plurality of other hardware components.

13. The system of claim 8, wherein when executed the application causes the at least one computing device to at least place an order for at least one of the subset of the set of hardware components from a vendor.

14. The system of claim 8, wherein when executed the application causes the at least one computing device to at least determine that the subset of the set of hardware components are compatible.

15. The system of claim 8, wherein the networked plurality of computing devices is operated under a utility computing model by a service provider, and the service provider retains administrative control over at least one feature of the customized computing device.

16. The system of claim 8, wherein the selection, the request, or both are received via at least one web service request.

17. A non-transitory computer-readable medium embodying a program executable in at least one computing device, wherein when executed the program causes the at least one computing device to at least:
    receive a selection of a subset of a set of hardware components from a client device;
    receive a request from the client device to allocate a customized computing device within a networked plurality of computing devices, the customized computing device including the subset of the set of hardware components; and
    responsive to the request:
    assemble the customized computing device with the subset of the set of hardware components; and
    install the customized computing device on a network in a data center.

18. The non-transitory computer-readable medium of claim 17, wherein when executed the program further causes the at least one computing device to at least receive from the client device a selection of a network bandwidth for the customized computing device.

19. The non-transitory computer-readable medium of claim 17, wherein when executed the program further causes the at least one computing device to at least receive from the client device a selection of a level of power redundancy for the customized computing device.

20. The non-transitory computer-readable medium of claim 17, wherein when executed the program further causes the at least one computing device to at least deploy a plurality of virtual machine instances on the customized computing device.

* * * * *